UNITED STATES PATENT OFFICE.

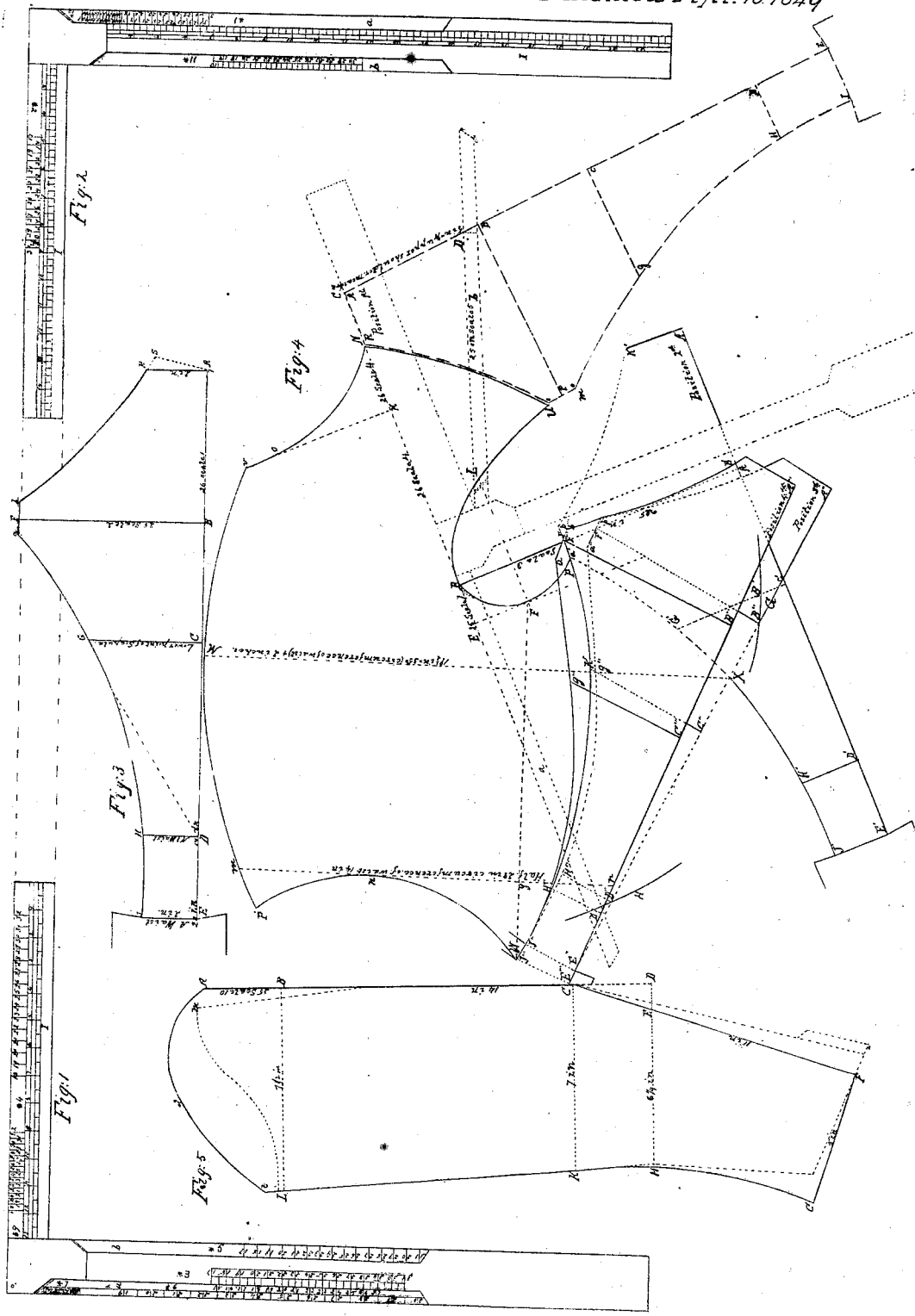

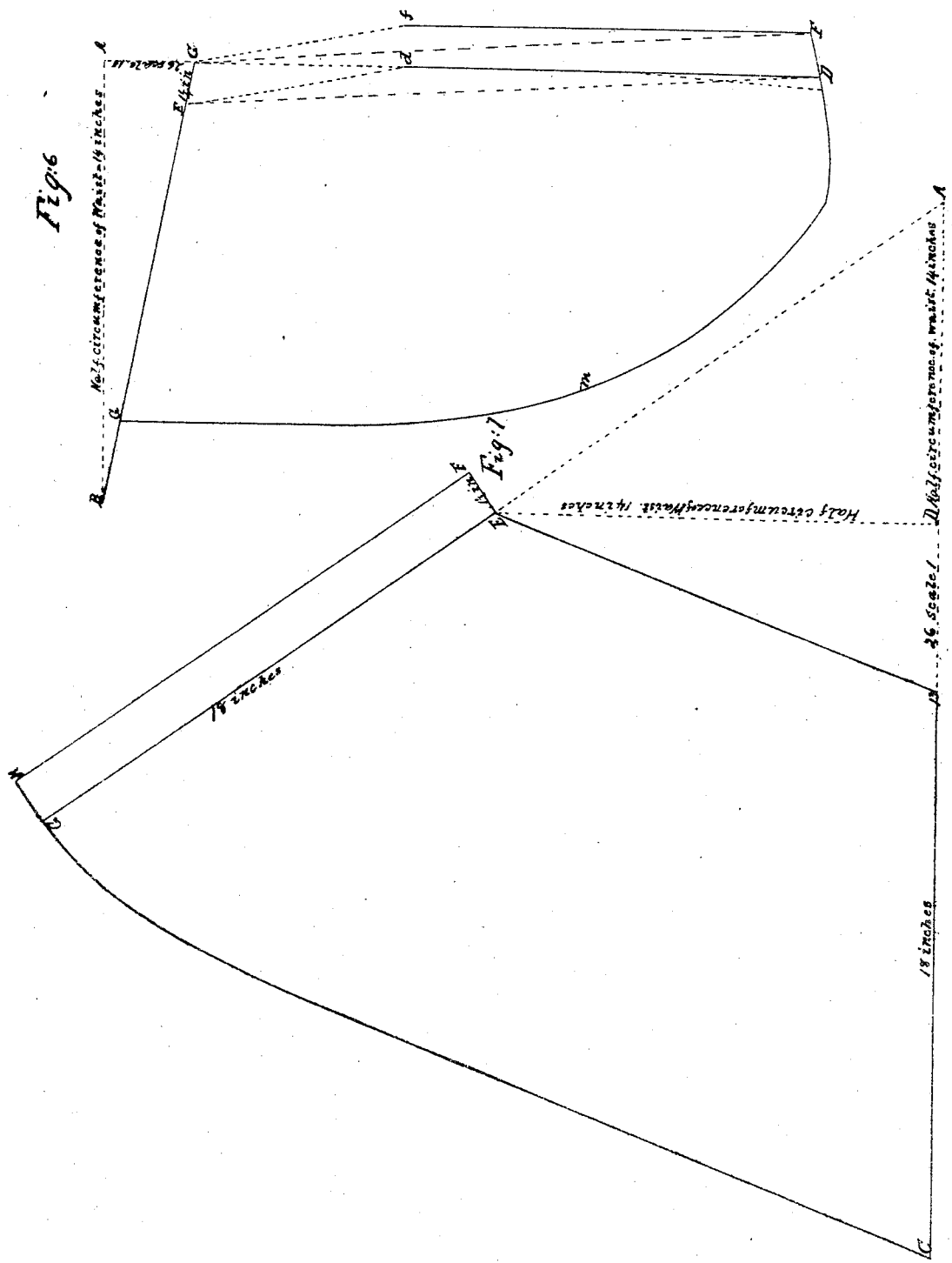
J. Carpenter.
Tailors' Measure.
Nº 6286                Patented Apr. 10. 1849

JOHN CARPENTER, OF UNIONTOWN, PENNSYLVANIA.

TAILOR'S MEASURE.

Specification of Letters Patent No. 6,286, dated April 10, 1849.

*To all whom it may concern:*

Be it known that I, JOHN CARPENTER, of Uniontown, Fayette county, Pennsylvania, have invented a new and useful Tailors' Mathematical Protractor, and that the following is a full, clear, and exact description thereof, reference being had to the accompanying drawings, which make part of this specification.

The object of my invention is to obviate those difficulties under which tailors have heretofore labored in the delineation of garments by any of the rules in use.

The scales, of which my instrument contains 11, are placed upon the two opposite faces of a square and of two radial arms.

Figures 1, and 2, represent the two opposite faces of the instrument with the several scales in their due positions, all drawn of one half the actual dimensions of the instrument made for use. In these two figures the radial arms $a$ and $b$ are seen to be closed against the edges of the longer limb of the square.

In Fig. 4, the exterior radial arm $a$ is seen opened so far as to form a straight line with the shorter limb of the square, and the interior radial arm $b$ is also represented as opened to an intermediate position between the long and the short limb of the square, all parts of the instrument being there represented by dotted lines. The several scales are marked each with a star (*) and the number of reference from 1 to 11; besides which, there are on the face of the shorter arm, Fig. 1, and on both limbs Fig. 2, scales of inches which are marked I in the drawings but which are generally left without any special marks on the instrument.

The use of my protractor may be exemplified by showing the manner in which I apply it to protract the measures for a back and breast of a coat, and the sleeve and skirts of dress and frock coats.

The measures to be taken are in this case as follows: First, from the neck joint to the lower extreme of scapula, say 10 in.; 2nd, natural length of waist, say 17 in.; 3d, fashionable length of waist, say 20 in.; 4, whole length of coat, say, 40 in.; 5, upper shoulder measure from neck joint around the shoulder to place of beginning, say 25 in.; 6, measure of scapula;—without moving the first end of the measure bring it around the arm to the lower extreme of the shoulder blade at the back seam, say 22 in.; 7, lower shoulder measure, drop the end of the tape from the neck joint a distance down equal to $\frac{1}{5}$ the upper shoulder measure then pass the tape around the arm to the same point which will be between the ties, 26 in.; 8, from back seam to elbow; 9, from back seam to hand; 10, circumference of the arm and hand; 11, circumference of breast, 35 in.; 12, circumference of waist, 28 in.

No balance measures are required or proof measures because the rule is constructed on such principles that if these measures are carefully taken and applied according to the rule, this will be all that will be necessary to secure a fit and the coat will be balanced right for any form.

Mode of delineating.

*1. For the back.*—Draw a line A E. (Fig. 3,) for the back seam; draw A R at right angles to A E=2 inches; make A B=26 parts on the scale marked *1 (Fig. 2;) make A C=10 inches on the scale of inches; make A D=17 inches (the length of the natural waist) on the same scale. Make A E=20 inches (=length of artificial or fashionable waist.) Now move the square along the line A E till the angle comes to B, and draw B F at right angles to A E, and set off on it the distance from the angle of the square to 25 on the scale *2 (Fig. 2). This determines the point F. Now through F and parallel to A E draw a F $b$ making a F and $b$ F each=$\frac{1}{2}$ an inch. From the point C raise the perpendicular C G (indefinite in length at first); also raise the perpendiculars D H and E J from the points D and E making D H and E J each equal to 2 inches. Join $a$ and D, and the point where the line $a$ D cuts the perpendicular C G fixes the point G. Through the points H and I draw the curve G H, (making its radius equal to the distance from B to E.) With the same radius through the points $b$ and R draw the curve $b$ R extending it $\frac{1}{2}$ an inch from R to S, and join S, A, with a slight inward curvature toward the line A R. The back of the coat being now protracted is cut out of the cloth and is used after the manner of a pattern for laying down certain of the lines to be marked on the front.

*2. For the front part.*—Fig. 4 exhibits four several positions in which the back, already cut out, is placed in combination with lines determined by means of the square its radial arms and scales, for fixing certain points and lines. These are severally marked in the drawing as follows: Position 1, with long dashes of alternate red and blue. Position 2 with plain red lines; position 3 with blue lines, and position 4 with plain black lines. The several positions are also marked with the same letters in corresponding parts as are found in Fig. 3, but in position 1st they are letters without accents (as in Fig. 3) while in position 2d the letters have single accents (') in position 3d double accents ('') and in position 4th triple accents (''') to each letter. In protracting the front part, I first draw the line A B (Fig. 4)=25 on scale *3 (Fig. 1), and numbered 25 corresponding to the inches in the upper shoulder measure; and at right angles to A B having placed the square as indicated in the dotted outline of the instrument, but with the angle on B, I lay off B C=26 parts on the scale *4 (Fig. 1.) Then retaining the square in the same position I move out the radial arm $b$, or inside transverse-bar, until the No. 25 on the scale *5, borne by that arm, is found by a tape line to be distant from No. 26 on scale *4 by a length equal to one-fifth of the shoulder measure (=5 inches). The point where the 25 on scale *5 then falls is marked D, through which from C draw C D unlimited toward D. Retaining the position of the square, I next move the outside radial arm, or traverse bar ($a$) until it comes into the position as seen at $a$, making a continuation of the line C B, and on the scale *7, seen on that radial arm (Fig. 1.) I lay off B E=25 parts. I now close both radial arms, and moving the angle of the square to E, (the shorter limb still lying along the line E C, I draw E F parallel to A B, making the line E F also=25 on scale *7. Parallel to E C I now draw F L=26 on scale *9. From the point C toward B, I lay off the distance C K also=26, scale *9, and perpendicular to K C draw K $o$ $v$ making K$o$=K C. Now to make the first application of the back piece, (already cut out) I place its angle A (Fig. 3, and position 1st, Fig. 4,) on the point C (Fig. 4) and let the back line A B C D E lie over the point D marked on the cloth as above described. While the back lies in this position (position 1st) I draw along the curve R C the corresponding curve N U on the cloth. The point U is thus fixed in position. I now make the second application of the back piece, (as seen in position 2d) placing the point B' on A and letting B' F' extend along A B, then will the point $a'$ fix the position of the point P. Draw the Cex-shaped curve through the points P F B L U.

To obtain the third position of the back, I now place the square once more on the line, A B and B C and holding it firmly in that position I open the outside radial arm and taking on its scale *6, the measure of scapula=22, as a radius, I strike the arc G and with the distance of 25 inches, and from the point C as a center, strike the arc H. Place the back with its point B'' on the arc G its point D'' on H, and F'' on the line A B and mark at G'' the point R on the cloth and from the point H'' the point $x$, and mark J'' on the cloth. Take the 4th position of the back so that the line H''' J''' shall lie upon the point J'', just marked upon the cloth and the point F''' at the same point which was occupied by F' in the 2d position. Then will the point J'' fix the position of the point W. Join W F and make W J=26 on scale *10 (Fig. 2,) for the "spring of the coat." At J, draw the perpendicular $p$ J $m$, and through the point W with a radius equal to ¼ of the circumference of the waist $$(= \frac{28}{G} = 7 \text{ inches})$$

draw a curve to which the line $p$ J $n$ $m$ shall be a tangent at the point $n$. This gives the curve W $n$ $p'$. From the point $p$ where the perpendicular J $p$ intersects the straight line C''' D''' measure to $m$ the half circumference of the waist (=14 inches). This fixes a point in the breast curve.

Parallel to $p$ $m$ and through the point R draw the line X R E, which measured from the point X in the back line at its third position must equal the half circumference of the breast +2 inches=17½+2=19½ inches. Through the points $m$, E, draw the curve $p'$ $m$ E $v$, which extended in one direction cuts the curve W $n$ $p'$ and in the other the line K $o$ $v$ the position of which has already been defined. Through the points P, R, $x$ and W, draw the curve for the side seam, and through the points N, $o$, $v$, draw the curve N $o$ $v$. This completes the protracting of the front part of the coat which may now be cut out.

3. *To delineate the sleeve.*—Draw A C, (Fig. 5)=14 inches, and make A B equal 25 on scale *10. Draw B L at right angles to A B=7½ inches. At C draw C K=7 inches. Make D E at right angles to D C, the continuation of A C having D C=25 scale *10 and D C to D E as 3:1, through E as found by this proportion draw D E; produce it to H and make E H=6¼ inches. Through E also draw C E and produce it to F making C F=11 inches. From F draw F G, at right angles to F C and make its length 5 inches, and through the several points draw the line G H K L. Extend K L to about ¾ of an inch and trace the curve $t$ 2 A, to join the sleeve with the body.

4. *For the skirt of dress coat.*—Draw A D, Fig. 6.=20 inches, and from A at right angles, draw A B=14 inches=½ circumference of waist, make A C=26 on scale *10. From C draw C B, make C E=1¼ inches. Draw E D and parallel to it draw C F. On A D lay off A d=7 inches and parallel to D d draw F f of the same length as D d, join E d and C f. The remainder according to fashion.

*5. For the skirt of a frock coat.*—Draw A C Fig. 7, making A B=½ circumference of waist, and B C=18 inches. From B make B D=26 on scale *1. Draw D E at right angles and=½ circumference of waist. Join A E and produce it to G, making E G=B C, and join C G. Draw E F at right angles to E G, and=1½ inches and draw F H parallel to E G.

Having thus described my invention I may add that I do not claim the use of a square for protracting garments on the cloth to be cut, as that instrument has long been in general use for that purpose, nor do I claim taking measures on the person in any way different from that in common use nor do I contemplate using my tailor's mathematical protractor for the purpose of taking measures on the person its great purpose being as herein described, to delineate correctly such measures on the surface of the cloth.

What I do claim as my invention and desire to secure by Letters Patent is—

The combination with the square, of the exterior radial arm $a$ and the interior radial arm $b$ having theron the several scales divided and numbered as herein represented for the purpose of protracting garments from measures taken upon the person in the manner substantially as herein set forth.

JOHN CARPENTER.

Witnesses:
WALTER R. JOHNSON,
E. R. DORR.